United States Patent
Cortez

[15] 3,635,265
[45] Jan. 18, 1972

[54] COPYING LATHE

[72] Inventor: Jose L. Cortez, 9050 East Jeff St., Bellflower, Calif. 90706

[22] Filed: Feb. 5, 1970

[21] Appl. No.: 8,897

Related U.S. Application Data

[63] Continuation-in-part of Ser. No. 755,302, Aug. 26, 1968, abandoned.

[52] U.S. Cl. .................................. 142/38, 142/1, 142/7
[51] Int. Cl. ........................................... B23b 3/28
[58] Field of Search ........................... 142/35–39, 42, 142/43, 46, 55, 1, 7, 9, 21, 22; 143/6 R

[56] References Cited

UNITED STATES PATENTS

| | | | |
|---|---|---|---|
| 2,036,241 | 4/1936 | Taylor | 142/38 X |
| 2,731,047 | 1/1956 | Webb | 142/55 |
| 2,564,350 | 8/1951 | Wilson | 143/6 X |
| 1,859,474 | 5/1932 | Shawver | 142/38 X |
| 1,540,801 | 6/1925 | O'Neel | 142/37 |
| 2,986,177 | 5/1961 | Markin | 142/56 |
| 1,239,486 | 9/1917 | Highams | 142/56 X |

FOREIGN PATENTS OR APPLICATIONS

| | | | |
|---|---|---|---|
| 85,761 | 7/1920 | Switzerland | 142/37 |

*Primary Examiner*—Leonidas Vlachos
*Attorney*—Fulwider, Patton, Rieber, Lee & Utecht

[57] ABSTRACT

A copying lathe having a first support for supporting and rotating a workpiece and a second support for supporting a template. A horizontal track is supported centrally above the first and second supports and mounts a freewheeling truck which has a carriage pivotally suspended therefrom. Mounted on the lower end of the carriage is a cutting blade and a follower for tracing along the profile of the template. A handle projects from the carriage whereby the lathe operator may pull the carriage longitudinally to trace the follower along the profile of the template to cut the workpiece to the desired shape.

2 Claims, 9 Drawing Figures

PATENTED JAN 18 1972

INVENTOR.
JOSÉ L. CORTEZ
BY Fulwider, Patton, Rieber,
Lee and Utecht.
ATTORNEYS

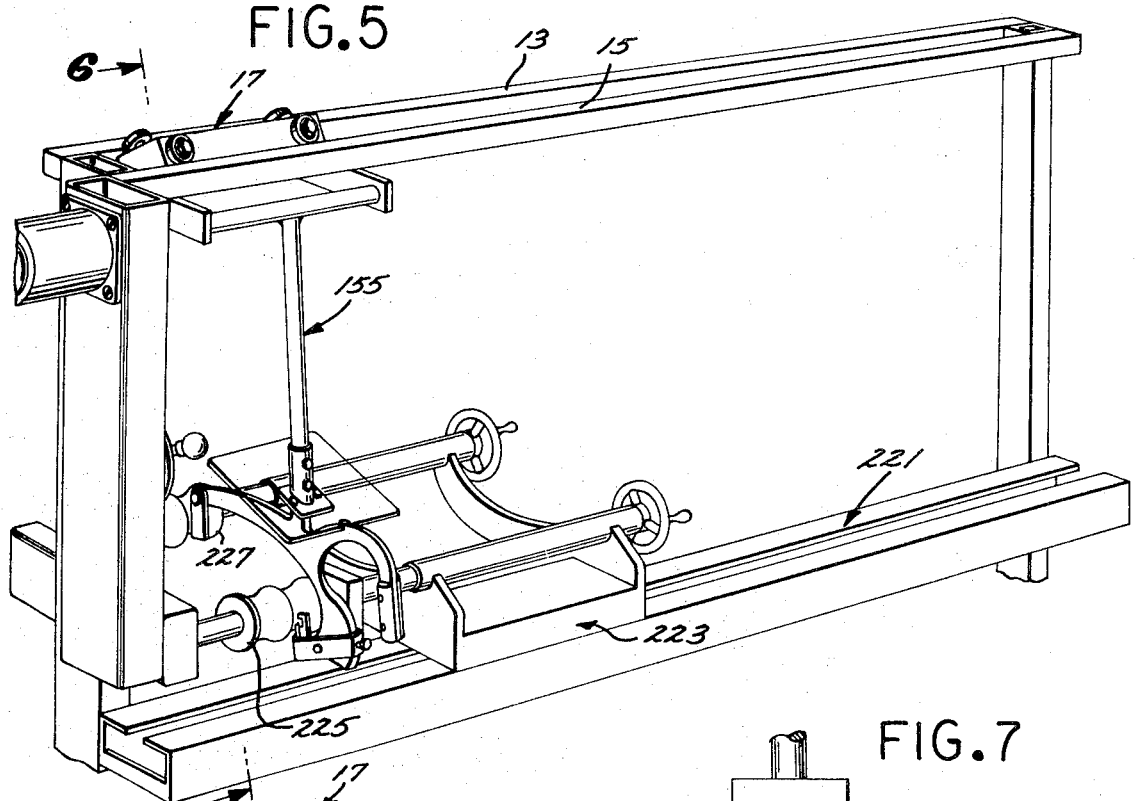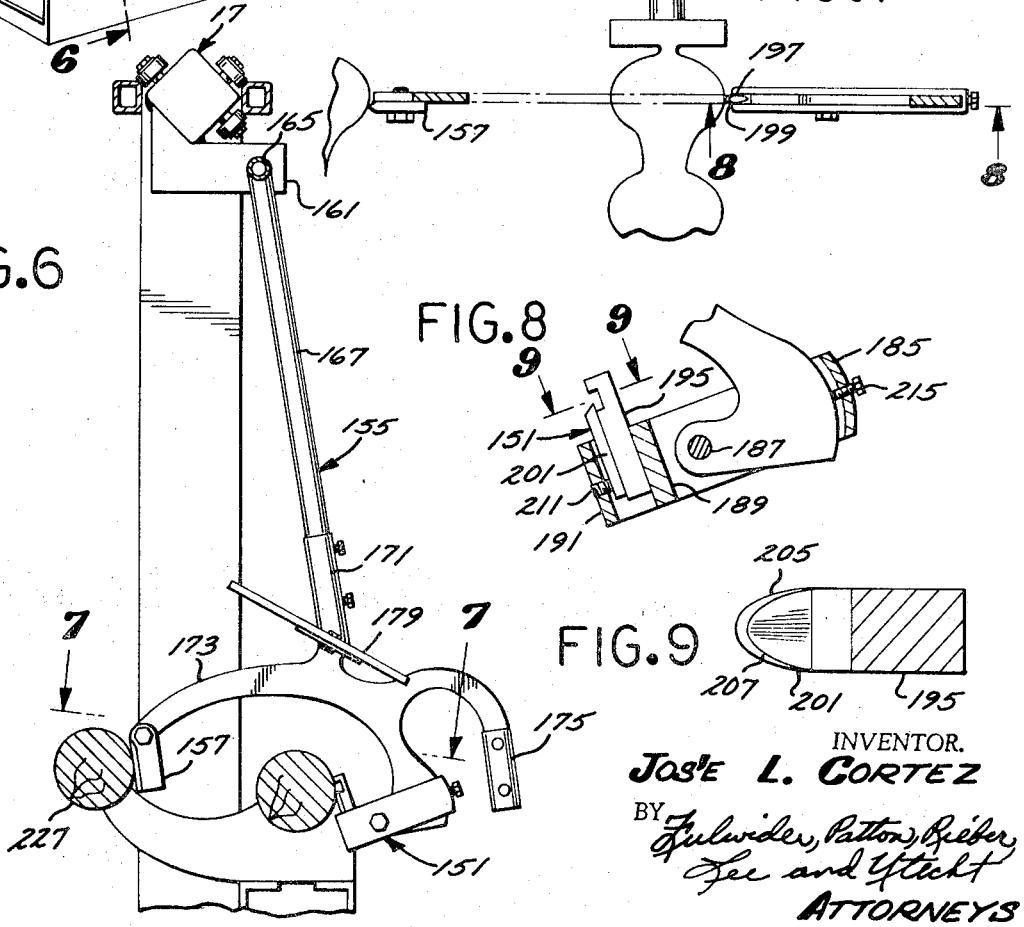

COPYING LATHE

CROSS-REFERENCE TO RELATED APPLICATIONS

This application is a continuation-in-part of U.S. application Ser. No. 755,302, filed Aug. 26, 1968, now abandoned.

BACKGROUND OF THE INVENTION

1. Field of the Invention

The present invention relates to lathes which employ a template to be traced by a follower to manipulate a cutting tool for turning a workpiece to a form corresponding to the template.

2. Description of the Prior Art

Copying lathes have been proposed which include followers for tracing the profile of a template to position a blade for cutting a workpiece in accordance with the trace. However, many prior art copying lathes suffer the shortcoming of requiring the operator to manipulate positioning screws or other feed mechanisms to control positioning of the cutting blade. Other prior art copying lathes require manual shifting of a carriage carrying the cutting tool and tracer. There are no copying lathes known to applicant which include a longitudinal track supported vertically above the work and mounting a freely movable truck which pivotally suspends a balanced carriage having a follower thereon for tracing the workpiece and a cutting blade whereby the operator may merely guide the suspended carriage to perform the cutting function.

SUMMARY OF THE INVENTION

The present invention is characterized by a longitudinal track supported above the template and workpiece of a copying lathe and mounting a freewheeling truck from which a balanced carriage is pivotally suspended. The carriage supports a follower for bracing the template and a cutting blade for cutting the workpiece to the form dictated by the template. Thus, a handle on the carriage can be grasped to wheel the truck along its track and with relatively little effort pivot the carriage to and fro on its axis to cut the workpiece to form.

Other objects and features of the invention will become apparent from a consideration of the following description when taken in conjunction with the accompanying drawings.

DESCRIPTION OF THE DRAWINGS

FIG. 5 is a perspective view of a second embodiment of the copying lathe of present invention;

FIG. 6 is a vertical sectional view, in enlarged scale, taken along the line 6—6 of FIG. 5;

FIG. 7 is a horizontal sectional view, in enlarged scale, taken along the line 7—7 of FIG. 6;

FIG. 8 is a vertical sectional view taken along the line 8—8 of FIG. 7; and

FIG. 9 is a horizontal sectional view, in enlarged scale, taken along the line 9—9 of FIG. 8.

DESCRIPTION OF THE PREFERRED EMBODIMENT

Figure 1:
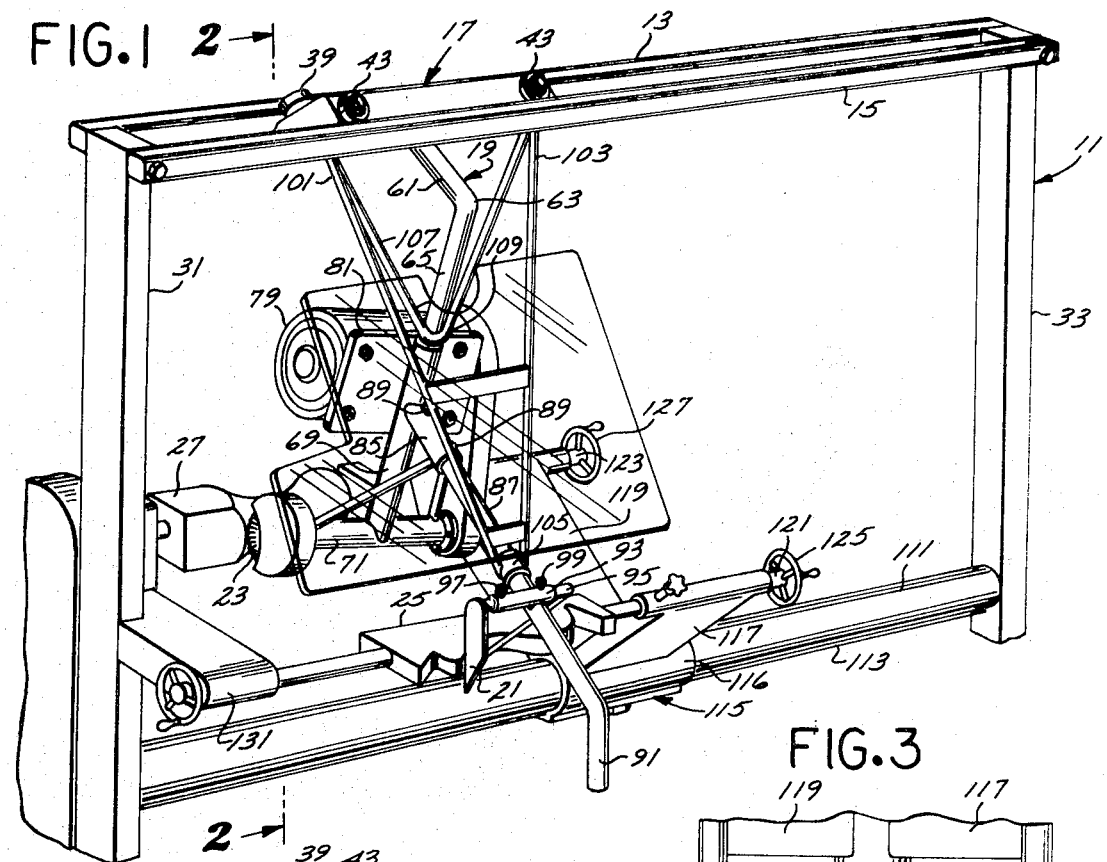
FIG. 1 is a perspective view of a copying lathe embodying the present invention.

The copying lathe shown in FIG. 1 includes a frame, generally designated 11, having a pair of horizontal, spaced-apart tracks 13 and 15 mounted thereon. A truck, generally designated 17, wheels along the tracks 13 and 15 and pivotally mounts a balanced carriage, generally designated 19, which supports a follower 21 on its lower end and a rotary cutting blade 23. Thus, the carriage 19 may be swung to and fro on its axis to trace the follower 21 along a template 25 as the truck 17 is wheeled along the tracks 13 and 15 to manipulate the rotary blade 23 for cutting the workpiece 27 to the form dictated by the template 25.

The frame 11 includes a pair of uprights 31 and 33 having the tracks 13 and 15 bolted to opposite sides of the upper extremities thereof. The truck 17 includes a central body 37 which mounts a pair of aligned wheels 39 (FIGS. 1 and 2) which track along the inside corner of the square-in-cross section track 13 and a pair of opposed wheels 41 which engage with the inside lower corner of the square track 15. A third pair of wheels 43 are arranged perpendicular to the wheels 39 and 41 and ride on the upper inside corner of the track 15 thereby cooperating with the wheels 39 and 41 to hold the truck 17 captive between the tracks 13 and 15.

Figure 2:
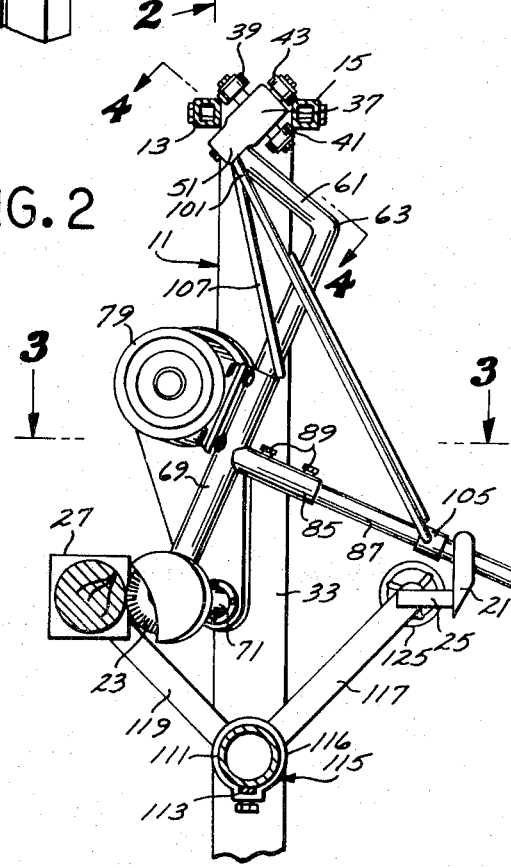
FIG. 2 is a vertical sectional view taken along the line 2—2 of FIG. 1.
Figure 3:
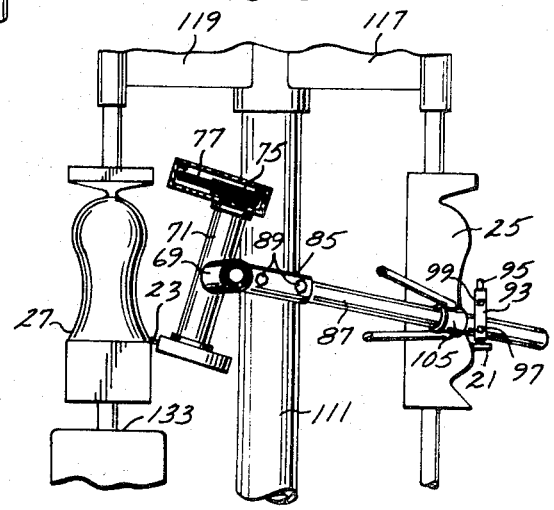
FIG. 3 is a horizontal sectional view, in enlarged scale, taken along the line 3—3 of FIG. 2.
Figure 4:
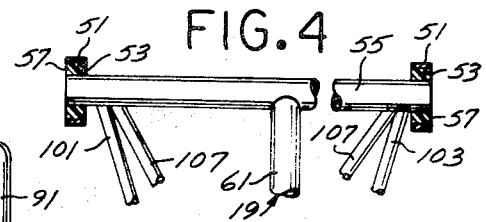
FIG. 4 is a sectional view, in enlarged scale, taken along the line 4—4 of FIG. 2.

The truck 17 includes a pair of downwardly angled end flanges 51 (FIGS. 2 and 4) which have aligned bores 53 therein. A pivot rod 55 has its opposite ends received within nylon bearings 57 molded in the bores 53. Referring to FIG. 2, a support arm is formed with a portion 61 connected centrally to the pivot rod 55 and angling downwardly to the right. The support arm forms a 90° bend 63 to form a portion 65 angling downwardly to the left to project beneath the truck 17 to balance the carriage 19 centrally below the truck 17. A pipe 69 is telescoped onto the lower end of the support arm portion 65 and supports a transverse hollow tube 71 on its lower end for receiving a drive axle which mounts the rotary blade 23 on one end thereof. Referring to FIG. 1, the right-hand end of the drive axle (not shown) mounts a pulley 75 (FIG. 3) which has a drive belt 77 threaded thereabout for upward extension to thread over a drive pulley carried by an electric motor 79. The motor 79 is mounted on a mounting plate 81 secured to the carriage 19. Still referring to FIG. 2, projecting perpendicularly to the left of the telescoped tube 69 is a tube 85 which has a handle 87 telescoped thereinto and held in position by a plurality of adjustment nuts 89. The handle 87 projects downwardly to the right (FIG. 2) and bends further downwardly at its free end to form a hand grasp portion 91.

A transverse tube 93 is welded to the handle 91 and receives a rod 95 which supports the follower 21 on one end thereof. A pair of setscrews 97 and 99 are screwed through the tube 93 to hold the follower 21 in adjustment.

Support struts 101 and 103 extend downwardly from opposite ends of the pivot rod 55 and are welded to a collar 105 carried on the handle 87. A strut 107 is secured on its opposite ends to the opposite ends of the pivot rod 55 and is reversed on itself at 109 and secured to the arm portion 65.

Mounted between the uprights 31 and 33 is a horizontal tubular rail 111 formed on its bottom side with a longitudinal rib defining a key 113. A mount, generally designated 115, includes a tube 116 which is journaled over the rail 111 and has a pair of oppositely extending, upwardly angled arms 117 and 119 which are formed on their upper extremities with horizontal bores for receiving threaded rods which form tail stocks 121 and 123, respectively. The tube 116 includes an internal keyway fitted over the key 113 to prevent rotation of the mount 115 and has a stud 124 screwed through the wall thereof to hold such support in position on the rail 111. Turning wheels 125 and 127 are mounted on the right-hand ends of the tailstocks 121 and 123, respectively, and the left-hand ends of each rod forms a conventional biting head for securement in the template 25 and workpiece 27, respectively. The left-hand ends of the template 25 and workpiece 27 are carried by hand stocks 131 and 133, respectively. The headstock 133 is coupled with an electric motor (not shown) for rotation of the workpiece 27.

In operation, the template 25 and workpiece 27 are installed by adjusting the mount 115 to the proper setting along the railing 111 for the length of template 25. The adjustment stud 124 is then tightened down and the respective headstocks 131 and 133 and tailstocks 121 and 123 tightened to hold the template and workpiece securely in position. The motor to rotate the workpiece 27 is then energized, as well as the motor 79 for driving the blade 23. The handle 91 is then grasped and the follower 21 moved into position against the profile of the template 25 thereby bringing the blade 23 into cutting engagement with the workpiece 27. As the blade 23 is fed into the workpiece 27 and the truck 17 pulled along the tracks 13 and 15, the workpiece 27 will be shaped to correspond with the profile of the template 25. It is important that the carriage 19 is suspended in a balanced condition from the truck 17 so it can be swung to and fro on the axis defined by the pivot rod 55 (FIG. 4) with little effort thereby reducing fatigue of the operator.

The rotary blade 27 cuts the workpiece 27 at a rapid rate and the operator has direct control over movement thereof so the truck 17 may be moved rapidly along the tracks 13 and 15 when only small amounts of wood are to be cut away and longitudinal movement thereof may be slowed when larger quantities of wood are to be removed.

The copying lathe shown in FIGS. 5 through 8 is similar to that shown in FIG. 1 except that a different cutting tool, generally designated 151, (FIG. 8) is employed. Suspended below the truck 17 is a carriage, generally designated 155, which carries the cutting blade assembly 151 and a follower 157 (FIG. 6). Referring to FIG. 6, a pair of L-shaped brackets 161 are welded to the lower side of the truck 17 and have a pivot rod 165 supported therebetween.

A downwardly projecting pipe 167 is welded to the pivot rod 165. A boss 171 is telescoped over the lower end of the pipe 167 and has a formed frame 173 connected to its lower end. The frame 173 mounts the cutting assembly 151, follower 157 and is formed with an operator's handle 175 disposed adjacent the cutting assembly 151. Also mounted on the framework 173 is a transparent chip shield 179 for intercepting upwardly flying chips.

The cutting assembly 151 includes a U-shaped mounting bracket 185 which fits over the lower extremity of the frame 173 and is centrally connected thereto by a pivot pin 187. The bracket 185 includes a transverse partition 189 and a front wall 191. A backup plate 195 is abutted against the partition 189 and is formed with a pair of forwardly projecting vertical cutting edges 197 and 199. Abutted against the front edge of the backup plate 195 is a cutting tool 201 which has the central section of its top portion ground out on the back side to define, in cross section, a U-shaped cutting edge and is beveled downwardly and forwardly to cause the opposite legs of the U-shaped cutting edge to define upwardly and rearwardly projecting flares 205 and 207 (FIG. 9). A setscrew 211 is screwed through the front wall 191 of the bracket 185 and abuts the cutting tool 201 and backup plate 195 to hold such tool and backup member in position. A set stud 215 screws through the back wall of the mounting bracket 185 and abuts the frame 173 to maintain the clocked position of the cutting assembly 151.

A track 221 is provided which mounts a work holding carriage, generally designated 223. The work holding carriage 223 includes means for supporting a work piece 225 to be turned and a template 227 for dictating the contour of the finished piece.

In operation, the copying lathe shown in FIGS. 5 through 9 operates similar to the copying lathe shown in FIG. 1. The template is mounted in place and the rough workpiece installed. The drive motor is then energized to commence rotation of the workpiece 225 and the handle 175 is grasped to move the cutting assembly 151 into cutting position. As the cutting assembly 151 moves into position against the rough workpiece 225, the U-shaped cutting edge of the cutting tool 201 will engage such workpiece to commence cutting along the upwardly and rearwardly angles flares 205 and 207 thereby forming fine chips and preventing splintering of the workpiece. The truck 17 may be worked up and down along its tracks 13 and 15 and the cutting assembly 151 works deeper into the cutting piece 225 until the follower 157 engages the template 227 thereby limiting further cutting and forming the final contour. It will be clear that if the normal bite of the cutting tool 201 is exceeded the vertical cutting edges 197 and 199 (FIG. 7) of the backup plate 195 will sever short lengths of chips thereby effecting cutting of the workpiece 225 in advance of the tool 201 to thereby assist in cutting while serving to limit forcing of the tool 201 deeper into the workpiece 225 and causing an oversize bite by the tool 201 which may result in an uneven finished product.

For different types of work and different grains of wood, the cutting assembly mounting bracket 185 may be adjusted to different angles by loosening the adjusting stud 215. The cutting tool 201 and backup plate 195 may be raised and lowered and the spacing therebetween altered by loosening the setscrew 211.

From the foregoing it will be apparent that the copying lathe of present invention is straightforward in design and economical to manufacture. Such copying lathe provides a convenient means for economic reproduction of particular wood shapes by relatively unskilled personnel. The lathe is convenient to operate thereby reducing fatigue and produces high quality turned wood pieces.

Various modifications and changes may be made with regard to the foregoing detailed description without departing from the spirit of the invention.

I claim:

1. A copying lathe comprising:

a frame including an elongated rail formed with a longitudinal key;

support means on said frame for receiving the respective one ends of a workpiece and a template;

a mount for sliding on said rail and formed with a keyway for receipt of said key, said mount including outwardly and oppositely projecting first and second arms having respective workpiece tail and template tailstocks thereon for receipt of the respective ends of said workpiece and template opposite said respective one ends to cooperate with said support means to hold said workpiece and template piece parallel to said axis;

a track spaced vertically from and extending substantially parallel with said axis;

a truck mounted on said track for wheeling therealong;

a carriage pivotally suspended from said truck;

a cutting tool mounted on said carriage;

a follower mounted on said carriage;

a handle on said carriage for manipulating said carriage whereby said handle may be grasped to trace said follower along the profile of said template and move said truck along said track to cause said tool to cut said workpiece to produce a profile corresponding to the profile of said template.

2. A copying lathe as set forth in claim 1 wherein:

said cutting tool includes first and second pairs of relatively closely spaced cutting edges for cooperating to cut relatively short chips from said workpiece, said second pair of cutting edges being spaced from said first pair for engaging said workpiece after said first-mentioned edges have bit into said workpiece a predetermined distance.

* * * * *